(No Model.)

2 Sheets—Sheet 1.

W. D. GRAY.
MIDDLINGS PURIFIER.

No. 489,676. Patented Jan. 10, 1893.

Fig. I.
on line 1-1

Witnesses:
Fabius J. Elmon
Raymond F. Barnes

Inventor:
W. D. Gray
By his Atty
P. T. Dodge (No Model.) 2 Sheets—Sheet 2.
W. D. GRAY.
MIDDLINGS PURIFIER.

No. 489,676. Patented Jan. 10, 1893.

on line 2-2

Witnesses:
Fabius J. Johnson.
Raymond F. Barnes.

Inventor:
W. D. Gray
By his Atty
P. T. Dodge

UNITED STATES PATENT OFFICE.

WILLIAM D. GRAY, OF MILWAUKEE, WISCONSIN.

MIDDLINGS-PURIFIER.

SPECIFICATION forming part of Letters Patent No. 489,676, dated January 10, 1893.

Application filed January 25, 1892. Serial No. 419,207. (No model.)

*To all whom it may concern:*

Be it known that I, WILLIAM D. GRAY, of Milwaukee, county of Milwaukee, and State of Wisconsin, have invented a new and useful Improvement in Middlings-Purifiers, of which the following is a specification.

My invention relates to that class of machines in which the material is treated on a flat shaking sieve or screen, subject to the influence of a current of air rising constantly therethrough and serving to carry away the dust and light impurities.

It is the aim of the present invention to produce a compact simple machine, in which the dust-laden air rising from the sieve may be purified or deprived of the solid matters held in suspension, and the purified air returned through the sieve from below, and this in such manner as to secure a substantially uniform flow of the air through all portions of the sieve, and to prevent the formation of vortical or eddying currents thereunder. With these ends in view I divide the current of air which has passed through the sieve, and after it is deprived of the dust return it downward past the two sides of the sieve into the chamber thereunder, so that it may again ascend therethrough. By thus dividing the air and causing it to flow inward and upward beneath the sieve from the two sides, I secure a practically uniform distribution and equalization of the separation or screening action not otherwise attainable.

My invention comprehends broadly the idea of dividing the purified air and delivering the same under opposite sides of the sieve in directions transverse to the length of the sieve that it may ascend therethrough, so that the counteracting or opposing currents flowing beneath the sieve will in a measure neutralize each other, and thus prevent the formation of vortical or eddying currents as before mentioned.

While I have represented herein a machine in the preferred form and a dust-catcher of the preferred construction it is to be understood that the details of construction may be modified and that a dust-catcher of any form the equivalent of that herein shown may be employed.

Figure 1:
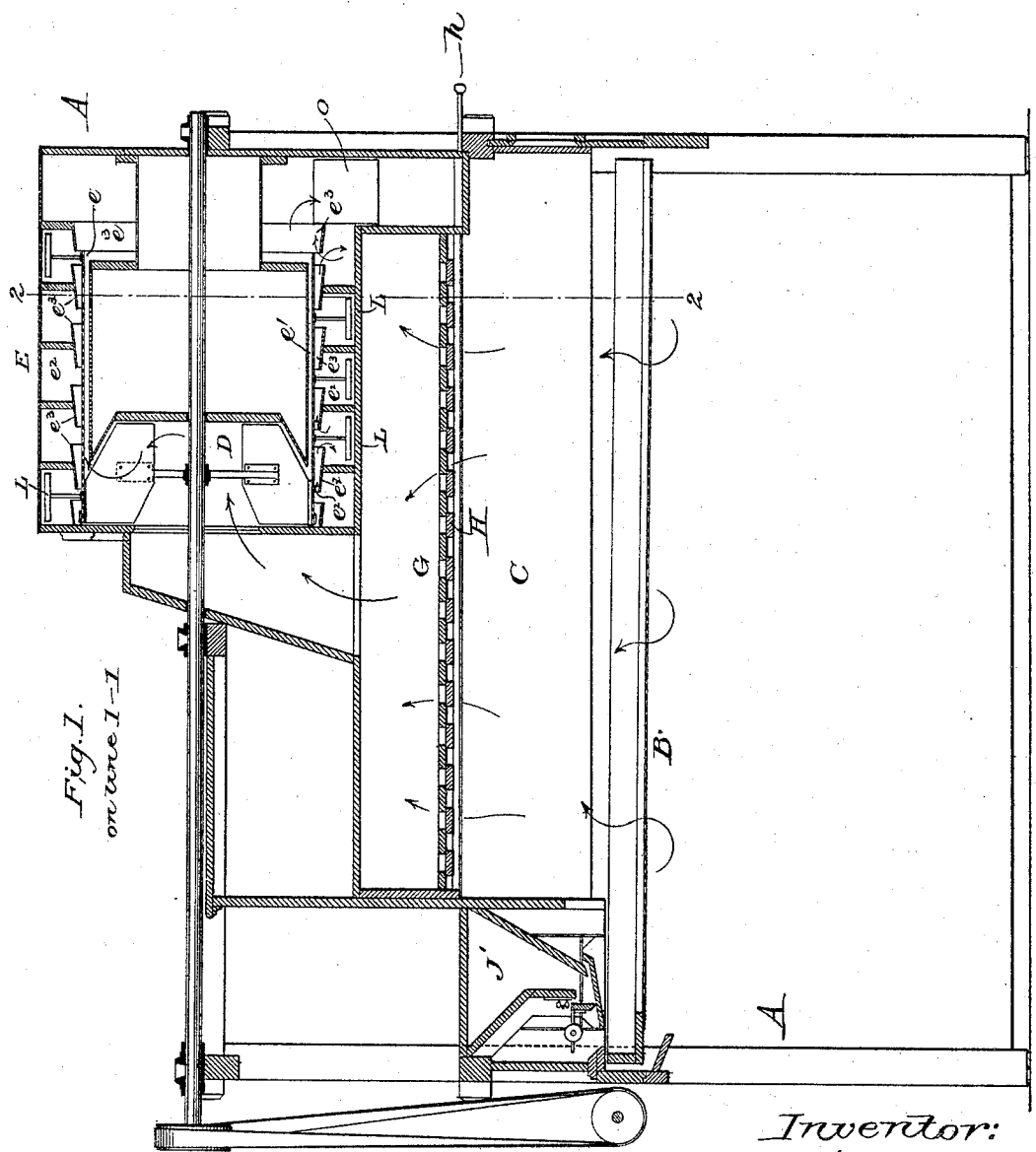
Figure 2:
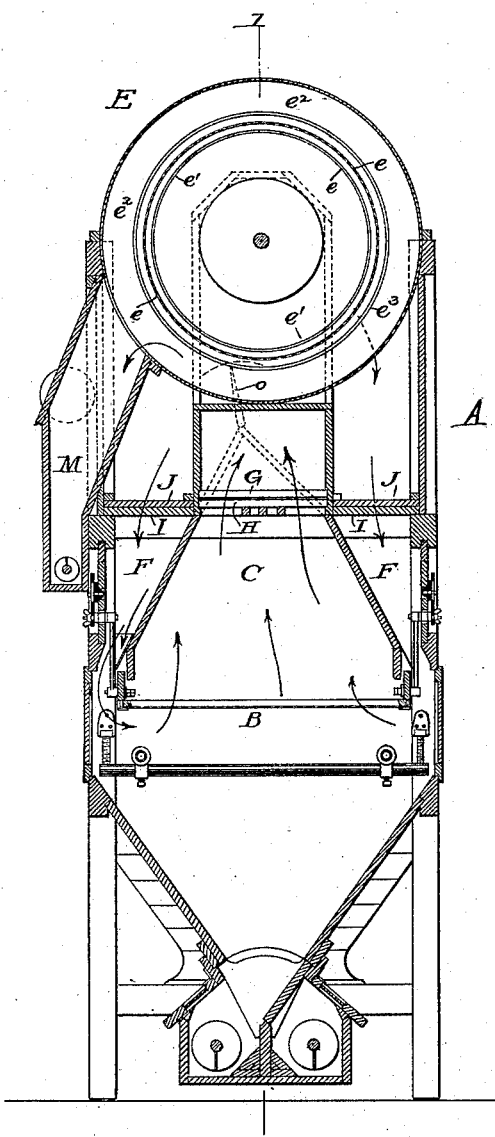

In the accompanying drawings,—Figure 1 represents a longitudinal vertical section through my machine, on the line 1—1 of Fig. 2. Fig. 2 is a vertical cross-section of the machine on the line 2—2 in Fig. 1.

Referring to the drawings,—A represents an external body or casing, which may be of any suitable form and construction adapted to contain the operative parts hereinafter described.

B is an ordinary flat shaking sieve, provided with bolting-cloth or other suitable material, and suitably graded from head to tail, as usual.

C is a longitudinal suction chamber lying above the sieve so that all air ascending through the sieve must enter this chamber. The walls of the chamber converge toward the top in cross-section, as shown, and communicate at one end with an exhaust fan D.

E represents a dust-catcher hereinafter described in detail, into which the fan discharges and from which the purified air is delivered at the tail end of the machine in a downward direction into two longitudinal flues or chambers F, lying outside of the suction chamber and communicating at their lower sides with open spaces extending downward past the sides of the sieve frame into the chamber thereunder. It will be observed that under the above arrangement there is a continuous circulation of the same or practically the same body of air upward through the sieve into the suction chamber, thence to the fan and through the dust-catcher and finally through the longitudinal chambers F, and downward again to the chamber beneath the sieve. It will be observed that the chambers F distribute the purified air throughout the length of the machine and that it flows downward in two currents past the sides of the sieve, so as to enter thereunder in opposite directions and transversely to the direction in which the material is flowing over the sieve. Since the air currents entering below the sieve have little or no tendency in the direction of its length therefore the air acts simply with a vertical lifting action on the material, allowing it to fall through the graded portions of the surface directly into the conveyers at the base. When the air currents have a whirling or eddying motion beneath the cloth or when they have a strong tendency toward the tail of the machine, it is found that they will take up and mix the different grades of material so as to prevent the clean and sharp grading which should be effected by the conveyers.

In order to regulate the force and velocity of the air ascending through the sieve I locate in the upper part of the suction chamber a stationary grated horizontal partition G, and place thereunder a corresponding grated valve H, provided at one end with a protruding handle $h$, by which it may be adjusted.

In order to prevent the air delivered by the fan from diving directly downward beneath the sieve and thereby producing a stronger blast at the tail than at the head of the machine, I locate below the fan and over the tail end of each of the side chambers F, a stationary horizontal board or deflector I, and a longitudinally movable overlying board J. By moving the last named board toward the head of the sieve the descending blast will be deflected to a greater or less extent along the side chambers F, so as to equalize the descending current throughout the length of the sieve. This equalization is desirable not only because of the reasons above stated but also because the coarse cloth at the tail of the sieve, offering less resistance than the fine cloth at the head, permits the air to ascend more readily so that an artificial regulation is advisable.

The material to be treated may be delivered to the head of the machine by means of an ordinary closed hopper J′, with a shaking shoe thereunder, as shown.

The dust-catcher, which, as above mentioned, may be of any appropriate character, is constructed, as shown in the drawings, as follows: Attached to and revolving with the horizontal shaft and the fan there is a cylindrical perforated screen $e$, of sheet metal or other suitable material. With in this cylindrical screen there is a stationary cylindrical drum or chamber $e'$, closed at its ends, so that the air entering from the fan is compelled to flow through the annular space existing between the outside of the drum and the inside of the screen. This cylindrical screen is encircled by a series of stationary pockets or chambers $e^2$, terminating at a distance from the screen, and each having at the inner edge an annular flange or lip $e^3$, arranged, as shown in Fig. 1, so that the entrance into each chamber consists simply of a narrow passage between the edges of the adjacent flanges. The cylindrical screen is provided at intervals along its length with out-reaching arms L, projecting into the annular chambers and provided at their outer ends with cross-arms or blades out of contact with the walls of the chamber.

On one side of the machine all the annular chambers $e^2$, communicate along the bottom with a closed side chamber M, intended to receive the dust and other solid matters, and provided at its base with a conveyer screw N, to effect its discharge. As the air is driven forward by the fan it passes through the meshes or perforations on the cylindrical screen and is projected outward in part through the annular passage into the chambers $e^2$, in which it receives a whirling or eddying motion, leaving behind it the dust and solid matters, after which the air returns again toward the screen, and so on repeatedly through the successive chambers until it leaves the tail end of the machine. The blades or fliers L, cause a movement of the air sufficient to discharge the precipitated matters from the chambers $e^2$ into the receiving chamber M.

Owing to the rotary motion of the fan it will have a tendency to direct the air downward more violently and in larger volume on one side of the machine than on the other. To counteract this tendency and equalize the flow I provide at the tail end of the machine a hinged laterally-movable valve or deflector O, in the path of the descending air.

I do not claim herein the construction of the dust-catcher shown in the drawings separately considered, as it will form the subject matter of a separate application for patent.

It will be observed that my machine is self-contained; in other words, that it comprises within itself and in compact form, all instruments necessary for the gradation and purification of the middlings or other grain products, and for the purification of the dust-laden air.

Having thus described my invention, what I claim is,—

1. The combination in a middlings purifier of a sieve, a fan acting to induce a current upward through the sieve, a dust catcher communicating with the fan chamber, longitudinal air passages at opposite sides of the machine communicating with the dust catcher, and opening into the chamber below the sieve past the sides of the latter.

2. In a middlings purifier, the combination of an inclosing chamber, a sieve therein, a dust-catcher, a fan inducing an air current upward through the sieve and thence through the dust-catcher, and means for dividing the air current above the sieve and compelling it to return downward past the two edges of the sieve and the space thereunder.

3. In a middlings purifier, the combination of a sieve, a suction fan drawing air upward therethrough, a dust-catcher to which the fan delivers the dust-laden air, and two longitudinal chambers at opposite sides of the machine through which the purified air is distributed lengthwise of the machine and from which it descends to the chamber beneath the sieve.

4. In a middlings purifier, a screen, the overlying exhaust chamber, the fan, the two longitudinal chambers at opposite sides of the machine through which the purified air is distributed lengthwise of the machine and returned beneath the sieve, and means, as deflectors, to insure the uniform distribution of the air throughout the length of the machine.

5. In combination with the sieve, the suction chamber, the fan and the side chambers for returning the air from the fan, a laterally-adjustable valve or deflector O, to equalize the current at the two sides of the machine.

6. In a middlings purifier, the combination of the body or casing, the screen thereunder, the suction chamber thereover, the fan, the dust-catcher consisting of the cylindrical screen and the annular chambers surrounding the same, and chambers or flues arranged to conduct the purified air from the dust-catcher beneath the two sides of the sieve.

In testimony whereof I hereunto set my hand, this 18th day of December, 1891, in the presence of two attesting witnesses.

WILLIAM D. GRAY.

Witnesses:
P. T. DODGE,
W. R. KENNEDY.